US006611614B1

(12) United States Patent
Jung et al.

(10) Patent No.: US 6,611,614 B1
(45) Date of Patent: Aug. 26, 2003

(54) IMAGE ACQUISITION APPARATUS

(75) Inventors: Stefan Jung, München (DE); Roland Thewes, Gröbenzell (DE); Werner Weber, München (DE)

(73) Assignee: Infineon Technologies AG, Munich (DE)

(*) Notice: Subject to any disclaimer, the term of this patent is extended or adjusted under 35 U.S.C. 154(b) by 481 days.

(21) Appl. No.: 09/597,350

(22) Filed: Jun. 19, 2000

Related U.S. Application Data (63) Continuation of application No. PCT/DE98/03660, filed on Dec. 14, 1998.

(30) Foreign Application Priority Data

Dec. 18, 1997 (DE) .......................................... 197 56 561

(51) Int. Cl.$^7$ ................................................. G06K 9/00
(52) U.S. Cl. ..................... 382/125; 340/5.53; 340/5.83; 348/294
(58) Field of Search ................................ 382/124, 125, 382/115, 156, 324, 205; 340/5.52, 5.53, 5.82, 5.83; 348/294; 358/482, 483; 713/202; 356/71; 283/68; 902/3

(56) References Cited

U.S. PATENT DOCUMENTS

| | | | |
|---|---|---|---|
| 4,060,713 A | 11/1977 | Golay | 382/156 |
| 4,792,982 A | 12/1988 | Devos et al. | 382/324 |
| 5,206,916 A | 4/1993 | Castelaz | 382/205 |
| 6,219,793 B1 * | 4/2001 | Li et al. | 713/202 |
| 6,259,804 B1 * | 7/2001 | Setlak et al. | 382/124 |

OTHER PUBLICATIONS

M. Tremblay et al.: "MAR: An Integrated System for Focal Plane Edge Tracking with Parallel Analog Processing and Built-in Primitives for Image Acquisition and Analysis", *Proceedings of the International Conference on Pattern recognition, Atlantic City*, Jun. 16–21, 1990, pp. 292–298, XP–000166504.

A.P. Fitz et al.: "Fingerprint Pre–Processing On A Hexagonal Grid", *European Convention on Security and Detection, London*, May 16–18, 1995, pp. 257–260.

Bruce H. McCormick: "The Illinois Pattern Recognition Computer—ILLIAC III", *IEEE Transactions on Electronic Computers*, 1963, pp. 791–813.

Y.M. Ting: "Detection Of The Core And Delta Of Fingerprints", *IBM Technical Disclosure Bulletin*, vol. 17, No. 2, Jul. 1974, pp. 406–407.

Werner Weber et al.: "On the Application of the Neuron MOS Transistor Principle for Modern VLSI Design", *IEEE Transactions on Electron Devices*, vol. 43, No. 10, Oct. 1996, pp. 1700–1708.

Richard C. Staunton: "An Analysis Of Hexagonal Thinning Algorithms And Skeletal Shape Representation", *Pattern Recognition*, vol. 29, No. 7, 1996, pp. 1131–1146.

\* cited by examiner

*Primary Examiner*—Timothy M. Johnson
*Assistant Examiner*—Ali Bayat
(74) *Attorney, Agent, or Firm*—Laurence A. Greenberg; Werner H. Stemer; Gregory L. Mayback (57) ABSTRACT

Sensor elements are arranged in a hexagonal grid. A processor element in the form of a primitive automaton is assigned to each of the sensor elements in the grid. The processor elements are set up to perform algorithms which enable lines of a fingerprint to be simplified such that characteristic minutiae of the fingerprint (endings and branchings of the lines) can be extracted. The processor elements are embodied using CMOS/Neuron MOS threshold value logic or using CMOS/NMOS pass transistor logic. The image grid can be read out via read-out circuits as a matrix.

7 Claims, 8 Drawing Sheets

IMAGE ACQUISITION APPARATUS

CROSS-REFERENCE TO RELATED APPLICATION

This is a continuation of copending international application PCT/DE98/03660, filed Dec. 14, 1998, which designated the United States.

BACKGROUND OF THE INVENTION

Field of the Invention

The present invention relates to a miniaturized image acquisition apparatus which is suitable, in particular, for recording fingerprints.

Automatic recognition of an image with a typical structuring, such as for instance in the case of a fingerprint, requires not only a unit for recording the image but also a unit for processing the image and for extracting significant constituents, such as the minutiae which are characteristic of a fingerprint. Previous solutions, one of which is described in IBM Technical Disclosure Bulletin 17, 406–407 (1974), require complicated circuits which take up a great deal of space and energy. Therefore, sensor units separate from the processing and evaluation unit have been used for recording small images such as for example fingerprints. The sensor units comprise a multiplicity of individual sensor elements arranged in a grid. The processing unit usually comprises a microcontroller and/or a digital signal processor. However, such hybrid systems are too expensive for application as a mass-produced product, which means that such constructions are too costly for a host of areas of application. The algorithms for evaluating the acquired image are often very complicated, e.g. in particular when, as in the above-mentioned IBM TDB, what is involved is extracting particular characteristics of the recorded image and comparing them with references.

Fitz and Green, in "Fingerprint Pre-Processing on a Hexagonal Grid," published in European Convention on Security and Detection, London 1995, pp. 257–60, describe a method for recording and processing fingerprints on a hexagonally subdivided grid. There, sub-grids each comprising 7 individual hexagons arranged in a hexagon are processed in order to simplify a black-and-white image. A development of that method is described in a publication by R. Staunton: "An Analysis of Hexagonal Thinning Algorithms and Skeletal Shape Representation", in Pattern Recognition 29, 1131–46 (1996). The algorithm described there reduces wide lines in the image to the smallest possible width.

Weber et al., in "On the Application of the Neuron MOS Transistor Principle for Modern VLSI Design" published in IEEE Transactions on Electron Devices 43, 1700–1708 (1996), describes transistor structures which make it possible to construct logic circuits with weightings of the input quantities.

SUMMARY OF THE INVENTION

The object of the invention is to provide an image acquisition apparatus which overcomes the above-noted deficiencies and disadvantages of the prior art devices and methods of this kind, and which is suitable for application with small dimensions and which is suitable for acquiring and processing characteristics of a line structure of the image.

With the above and other objects in view there is provided, in accordance with the invention, an image acquisition apparatus, comprising:

a plurality of sensor elements arranged in a hexagonal grid dimensioned for acquiring a fingerprint sufficiently differentiated for identifying a person;

a plurality of processor elements each associated with a respective sensor element and integrated in accordance with the grid;

each of the processor elements having a memory unit for storing values;

each of the processor elements being connected to adjacent processor element in the grid for receiving values output by the adjacent processor elements;

the sensor elements being constructed for a capacitive measurement within a patterned, electrically conductive layer;

circuits associated with the sensor elements or the respectively assigned processor elements for generating a logic '0' or '1' depending on a capacitance ascertained by the sensor element;

the processor elements being adapted to store a logic "0" or "1"; and each of the processor elements being configured for implementing algorithms for:
a) setting the stored value from '1' to '0' if at most one connected processor element communicates a value '1';
b) setting the stored value from '0' to '1' if at least five connected processor elements communicate the value '1';
c) setting the stored value from '1' to '0' if at least two connected processor elements communicate the value '1';
d) setting the stored value from '1' to '0' if two connected processor elements of a first pair communicate the value '1' and two connected processor elements of a second pair communicate the value '0' and if the connected processor elements belonging to the same pair are adjacent to one another in the grid and are not adjacent to the processor elements of the respective other pair.

In accordance with an added feature of the invention, the storage units have at least one first storage device and one second storage device, and the processor elements are configured for storing, with respect to a measured value communicated by the sensor element, one of two possible values in the first storage device and the respective other possible value in the second storage device.

In accordance with an additional feature of the invention, each processor element is constructed with at least one neuron MOS circuit for weighting the values communicated by connected processor elements, arithmetically combining the values with one another, and feed the values to an evaluation circuit.

In accordance with another feature of the invention, the neuron MOS circuit comprises:

a first multiplexer with twelve inputs, enabled for a simultaneous changeover for selecting four of the inputs simultaneously in each case, and with four outputs;

a second multiplexer with eight inputs, enabled for a simultaneous changeover for selecting two of the input simultaneously in each case, and with two outputs;

the evaluation circuit with a first input and a second input connected to the outputs of the second multiplexer, and a further input via which the evaluation circuit can be caused to yield the logic value '1' if a value at the first input is greater than a value at the second input, and to instead yield the logic value '1' if the value at the first input is less than the value at the second input; and six summers each two formed by respective pairs of neuron MOS transistors;

wherein the values supplied by the connected processor elements are fed to a first one of the summers and to the inputs of the first multiplexer, so that the values of two pairs of processor elements which are adjacent to one another, but are not adjacent to the respective other pair, are always present at the outputs of the first multiplexer; and some of the summers being connected to the outputs of the first multiplexer and a respective pair of the summers or the sensor element being connected to simultaneously selected inputs of the second multiplexer such that the algorithms can be processed by changing over the multiplexers.

In accordance with a further feature of the invention, each processor element is constructed with at least one NMOS pass transistor logic circuit operating as a switch between a reference-ground potential and an evaluation circuit.

In accordance with again a further feature of the invention, the circuit includes:

first, second, third, fourth, and fifth functional blocks each comprising a number of NMOS transistors connected as one of AND gates and OR gates;

a multiplexer with one input and twelve outputs; and a master-slave RS flip-flop for storing a state and for carrying out an evaluation; and wherein the functional blocks are connected in parallel between the multiplexer and the master-slave RS flip-flop and only one functional block is at one time connected to the reference-ground potential via the multiplexer;

inputs for receiving the values communicated by the respectively connected the processor elements and complementary values thereof at the functional blocks;

wherein the first functional block short-circuits an input of the master flip-flop to the reference-ground potential if at least five of the six communicated values have the logic value '1' wherein the second functional block short-circuits an input of the master flip-flop to the reference-ground potential if at least five of the six communicated values have the logic value '1' and a signal at the output of the slave flip-flop has an intended logic value, the relevant input being selected by transistors using a global control quantity and a complement thereof;

wherein the third functional block short-circuits an input of the master flip-flop to the reference-ground potential if the communicated values of two connected processor elements of a first pair, the processor elements being selected by the multiplexer and being adjacent to one another, have the logic value '1' and the communicated values of two connected processor elements of a second pair, the processor elements being adjacent to one another and not being adjacent to the processor elements of the first pair, have the logic value '0';

wherein the fourth functional block short-circuits an input of the master flip-flop to the reference-ground potential depending on whether the communicated value of a connected processing element, selected by the multiplexer, has the logic value '0' or '1' in one of three directions provided; and wherein the fifth functional block has a transistor controlled by the logic value supplied by the sensor element and by means of which an input of the master flip-flop is short-circuited to the reference-ground potential depending on the global control quantity and the complement thereof.

In the case of the apparatus according to the invention, an image, e.g. of a fingerprint, is acquired by means of a multiplicity of sensor elements arranged on a grid having a preferably hexagonal basic structure. A dedicated processor element is present for each sensor element, said processor element being arranged in the vicinity of the respective sensor element in accordance with the subdivisions of the grid. The processor elements are provided for storing values which result from a measured value supplied by the sensor element, preferably a logic '0' or '1', and for performing suitably implemented algorithms, in order to modify the stored value, if certain conditions on this value and values from storage devices of adjacent processor elements are met. These algorithms may be provided in particular for eliminating irregularities in the acquired image which are relevant to the acquisition of the basic structure. In addition, these algorithms can be used to emphasize the contours of the image more distinctly, e.g. by wide lines being reduced to a minimum standard width predetermined by the grid. If the apparatus is provided for acquiring and identifying fingerprints, evaluation algorithms may be implemented in the processing elements, which evaluation algorithms can be used to ascertain characteristic locations (minutiae such as e.g. end points and branchings of the lines) and compare them with stored references.

An individual element of the apparatus according to the invention therefore in each case contains a sensor element and a processor element—provided for processing—with a storage unit. Such a unit of the apparatus can therefore be produced as a circuit by the methods for producing microelectronic components. Each processor element is connected to a group of processor elements that is in each case fixedly chosen from the rest of the processor elements, in such a way that the processor element can receive values communicated from the connected processor elements. Preferably, each processor element is connected in this way to the adjacent processor elements (six processor elements in the case of a hexagonal grid). The processor element forwards the value which is present in its storage unit to the (e.g. six) adjacent processor elements and receives, via an assigned input in each case, the value communicated from said processor elements, which value was stored by the respective adjacent processor element. The group of processor elements connected to a processor element need not necessarily include the processor element immediately adjacent to said processor element, but rather may additionally or exclusively include more remote processor elements in a manner adapted to the algorithms implemented in each case.

The connections between the processor elements are preferably formed by electrically conductive connections. The use of a grid formed by parketting using the same sized, preferably regular, hexagons as a basis for the arrangement of the individual units which each comprise a sensor element and a processor element has the advantage that the images are acquired particularly efficiently with regard to the further processing that is necessary. This results from the density of the parketting, the number of immediately adjacent neighbors and the symmetry present.

The particular advantage of the apparatus according to the invention resides in the fact that very small image structures can be acquired, since the units of which the apparatus is composed contain the processor elements and require only a small area. The processor elements operate completely in parallel and are controlled by global clock, supply and control lines. The global control lines enable the processor elements to be configured into a plurality of specific states each corresponding to a processing step by means of an algorithm. Owing to the integration of the processor elements within the grid provided for the image acquisition, the data processing speed is very high, and only a small amount of energy is consumed. Although each processor element can be realized as a low-power circuit and operates relatively slower in this case, a very good functionality (performance) of the entire system is achieved by the parallel processing.

In accordance with a concomitant feature of the invention, the outputs of the processor elements at the edge of the grid are fed back to a free input thereof, for establishing virtually mirror-symmetrical boundary conditions at the edges. The array of the arrangement can be read out sequentially by addressing circuits located at the edge.

An individual processor element forms a primitive automaton. It is provided with a storage device, in which a value assigned to a measured value of the sensor element can be stored, and also a logic circuit, which determines, from this value and the values from the connected processor elements which are present at the inputs of the processor element, a new valid value which is stored in the storage device instead of the old value. The processor element preferably has a storage unit having two state storage devices, only one of which is active in each case. By way of example, a logic '0' or '1' assigned to the measured value of the relevant sensor element may be stored in one storage device. The complementary value with respect thereto (that is say a logic '1' or '0', respectively, in the example) is stored in the other storage device, with the result that the totality of these second storage devices contains the inverted image.

Other features which are considered as characteristic for the invention are set forth in the appended claims.

Although the invention is illustrated and described herein as embodied in an image acquisition apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
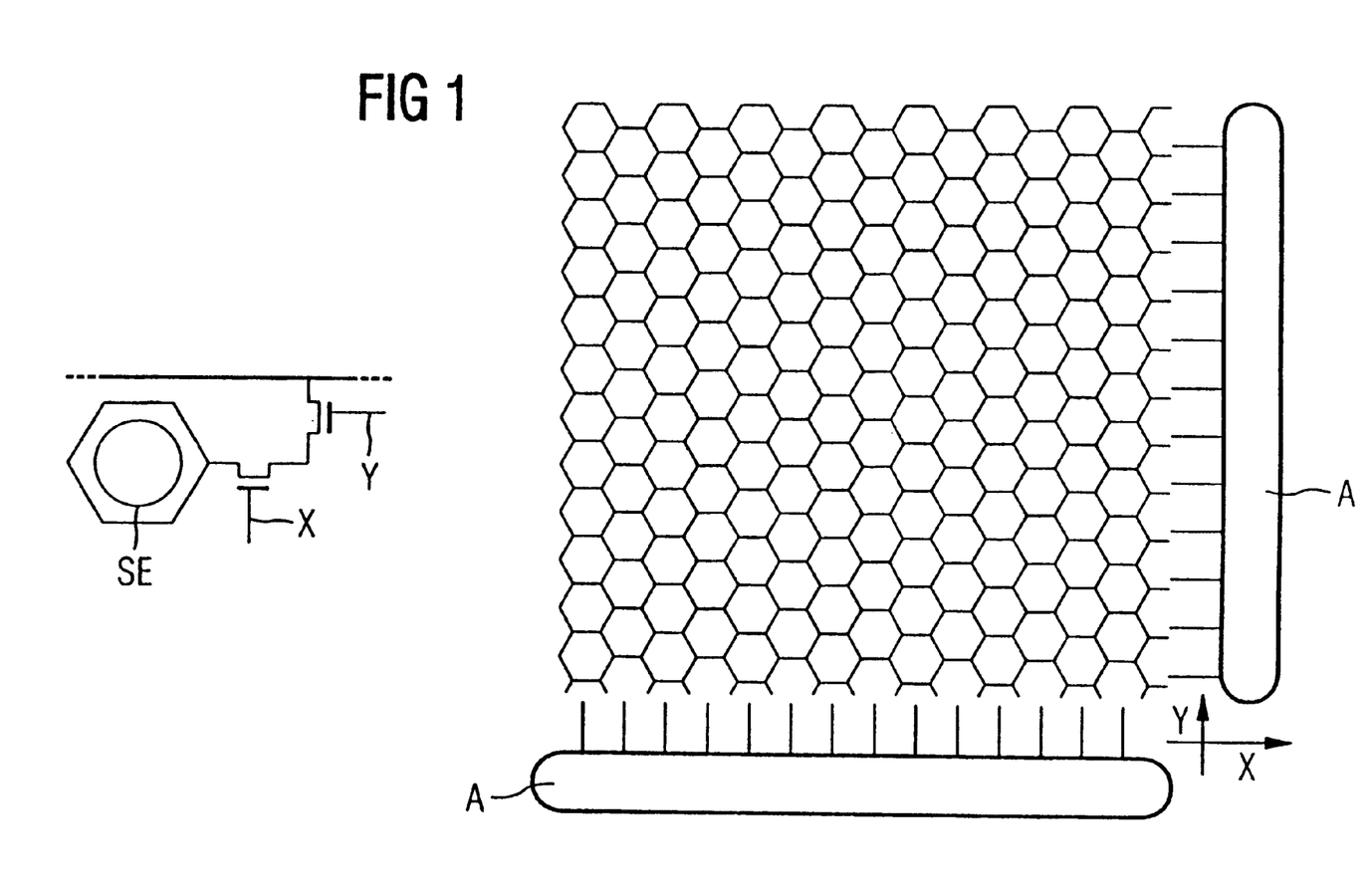
FIG. 1 is a diagrammatic view of the arrangement of the sensor elements and processor elements in the example of a hexagonal grid.

Referring now to the figures of the drawing in detail and first, particularly, to FIG. 1 thereof, there is seen a diagram of the apparatus according to the invention in plan view. Individual sensor elements SE are arranged in a grid, which is formed by uniform hexagons in this example. Such a sensor element is shown enlarged as an example on the left-hand side of FIG. 1, with a circular sensor area and with selection transistors for the X-direction and the Y-direction. The sensor elements may have other geometrical shapes, in particular (e.g. hexagonal) dimensions in accordance with the subdivision of the grid. Each sensor element is assigned a processor element which is integrated preferably directly below the sensor element in the region of the relevant subarea of the grid in the apparatus.

For read-out of the sensor array, selection circuits A (e.g. pointer circuits) may be present, which address the units of the sensor array in the X-direction and Y-direction in this example. The values stored by the processor elements can be read out in this way. This procedure corresponds, in principle, to the read-out of a matrix memory. What is essential to the apparatus according to the invention is that the processor elements are present in each case integrated in the vicinity of the sensor elements in the grid. If this apparatus is provided as a fingerprint sensor, it is advantageous if the individual sensor element is designed, for a capacitive measurement, essentially as a capacitor plate within a patterned, electrically conductive layer and is arranged under a bearing area for a fingertip. The sensor element or the assigned processor element is then provided with a circuit which can be used to generate a logic '0' or '1', depending on the capacitance ascertained by the sensor element by means of a measured charge or voltage.

Figure 2A:
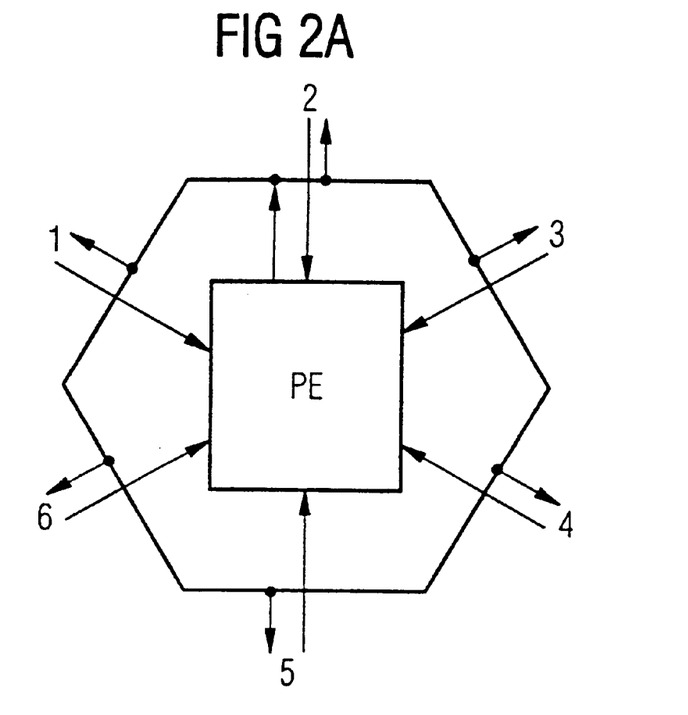
FIG. 2a is a diagram of the inputs and outputs of a processor element for the example of a hexagonal grid.

In a preferred embodiment of the apparatus, the hexagonal grid illustrated in FIG. 1 is used and each processor element is connected to the six immediately adjacent processor elements in this grid. FIG. 2a shows such a processor element PE with an output which is branched to six outputs 1, 2, 3, 4, 5 and 6 to the six adjacent processor elements. The processor element is additionally provided with a respective input for each of the six adjacent processor elements. In this way, a value stored in the storage unit of the processor element can be forwarded to the six adjacent processor elements.

Figure 2B:
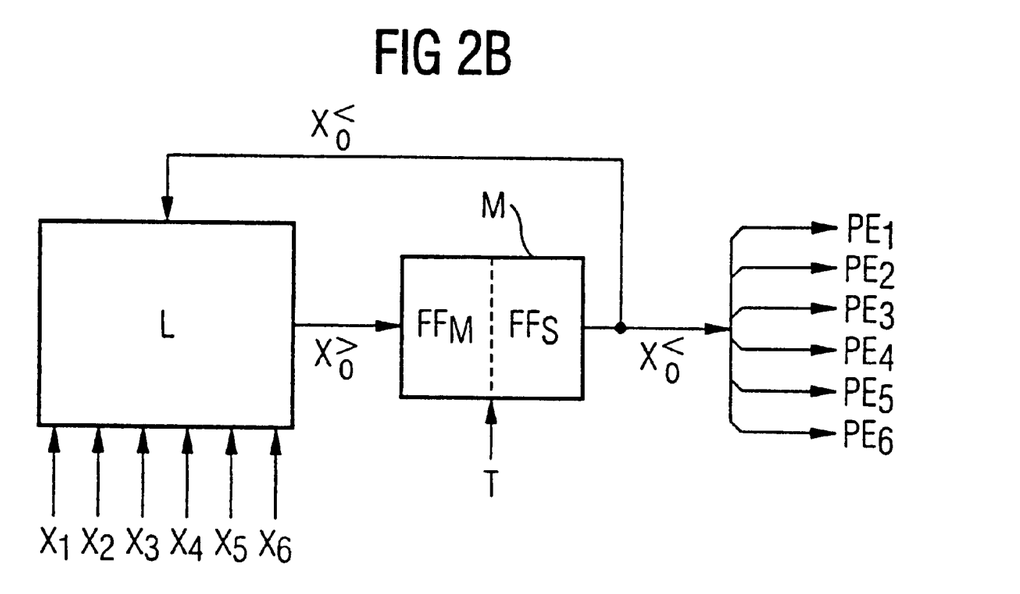
FIG. 2b is a block diagram illustrating the structure of a processor element.

FIG. 2b represents the fundamental method of operation of the processor element using a block diagram. The values of the connected processor elements, the six values $X_1$, $X_2$, $X_3$, $X_4$, $X_5$ and $X_6$ of the adjacent six processor elements in this example, are fed together with the value $X_0^<$ stored by the processor element itself to a logic circuit L. The logic circuit processes these values in order, in this way, to calculate a new value $X_0^>$. This value $X_0^>$ is fed to the storage unit M, which, in a preferred embodiment depicted as an example in FIG. 2b, is formed by two flip-flops connected as a master-slave RS flip-flop. The newly determined value is stored in the master flip-flop (left-hand flip-flop $FF_M$ in the figure) and is advanced into the slave flip-flop (right-hand flip-flop $FF_S$ in the Fig.) when certain conditions are present, under the control of an applied clock signal T. The slave flip-flop in each case contains the value corresponding to the old state of the relevant pixel. This value $X_0^<$ is fed to the logic circuit in order that the new value $X_0^>$ can be calculated taking account of the old value. The respective present value $X_0^<$ of the slave flip-flop is applied to the outputs, six outputs in this example, to the adjacent processor elements $PE_1$, $PE_2$, $PE_3$, $PE_4$, $PE_5$ and $PE_6$. The use of such a storage device has the advantage that the evaluation can be effected for all the pixels using the stored (old) values and only afterwards are the new values stored, so that the old values are always available for the evaluation. Corruptions which might occur if partly old and partly already new values are processed by the processor elements do not occur, therefore, during the implementation of algorithms for processing the stored values.

The processor elements may be set up for implementing a plurality of algorithms by means of which the structure of the acquired image can be simplified or improved in terms of the contouring. During the acquisition of a fingerprint, a measured value of the individual sensor element, said measured value depending on the structure of the fingerprint, is converted into a logic '0' or '1'. A representation of the fingerprint is thus obtained as a black-and-white image whose resolution corresponds to the size of the underlying grid. This image is improved by the application of different algorithms in order, in particular, to be able to work out the characteristic minutiae, and thus identify the fingerprint.

Figure 3A:
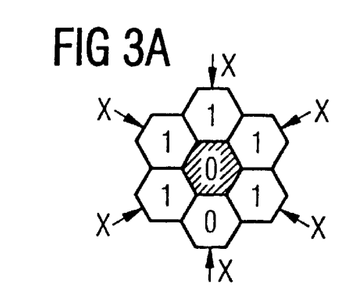
FIGS. 3A–3D are diagrammatic view of various configurations for values stored by connected processor elements.

FIG. 3a illustrates an arrangement of seven cells of the grid, a central cell being completely surrounded by six cells. Each cell contains a dedicated sensor element and a dedicated processor element with a storage unit in which the present value '0' or '1' of the relevant pixel is stored. For such an arrangement of seven cells, the English term "template" is used below for the sake of simplicity. In order to process the acquired image, the processor element evaluates the value that it has stored together with the values of the connected, in this case six adjacent, processor elements and thus determines a new value. The algorithms are performed one after the other in a suitable manner, in which case they are performed by the processor element concerned in each case only when the associated conditions are met.

An algorithm may be provided for filling in white gaps in the black-and-white image. For this purpose, white pixels, to which e.g. the logic value '0' is assigned and which are surrounded by at least 5 black pixels, may be converted into a black pixel (see template in FIG. 3a). The logic circuit of the processor element ascertains that the stored value is '0' and that at least five of the six connected processor elements communicate the value '1'. As a result, the condition is met for changing the white pixel into a black pixel, and the processor element stores the value '1'. Given the use of a storage unit in accordance with FIG. 2b with a master-slave RS flip-flop (designated by MS-RS-FF in the Fig.) the new value is accepted into the slave flip-flop from the master flip-flop under the control of the clock signal T.

Figure 3B:
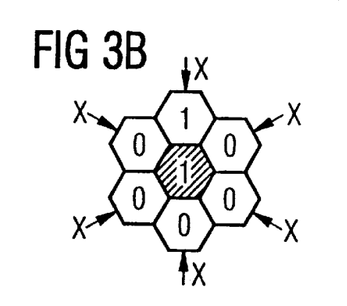

Individual black pixels protruding from a relatively large structure can be removed using a further algorithm. If a processor element has stored the value '1' and at most one of the adjacent processor elements communicates the value '1', as is the case when the associated template looks like that in FIG. 3b, the processor element can, as a result of the associated algorithm, change the value '1' to the value '0'. The edges of the image structure are thus smoothed. This algorithm is preferably employed first of all in order to allow the line structure of the image to emerge more distinctly. White gaps are subsequently filled in by the value of the central pixel in templates corresponding to FIG. 3a being set from '0' to '1'. The orientation is unimportant in each case, that is to say the templates drawn in FIGS. 3a and 3b can be rotated by multiples of 60°.

Figure 3C:
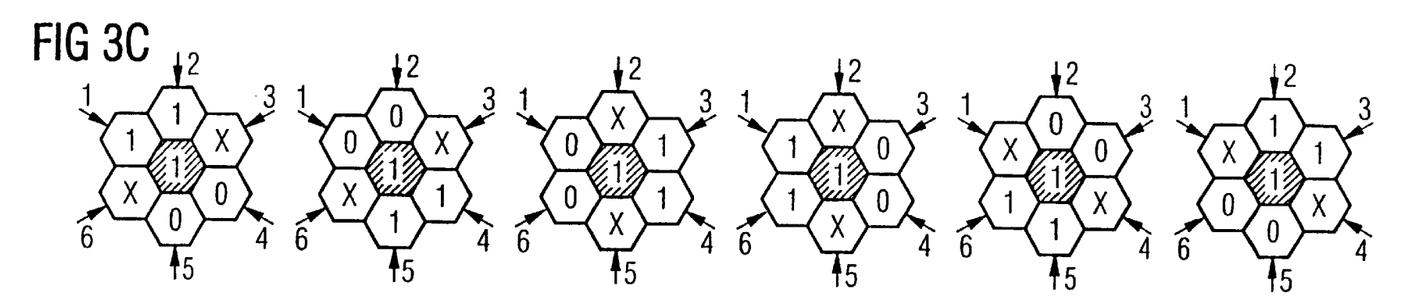

The processing of the templates drawn in FIG. 3c reduces wide lines to lines having a width of 1 pixel. The values designated by x may be '0' or '1' and are unimportant for the algorithm. All that is essential is that two pairs of connected processor elements are present, so that in each case the two processor elements of one pair communicate the value '1' and the processor elements of the other pair communicate the value '0'. The processor elements of the pairs are each adjacent to one another, and each processor element of one pair is not adjacent to the processor elements of the other pair, so that the two pairs, as is illustrated in FIG. 3c for various orientations of the template, are arranged parallel to one another. This algorithm is employed in each case for one template of FIG. 3c in the entire image, then for another template of FIG. 3c likewise in the entire image, etc., for all of the templates represented. The algorithm is implemented a number of times cyclically always in the same order of the templates, which is inherently arbitrary and need not correspond to the order shown in FIG. 3c.

Figure 3D:
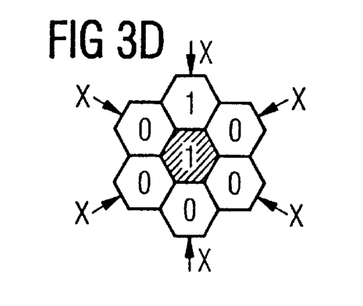

A further algorithm is provided for ascertaining line ends. An end of a line having a width of one pixel is represented in the template in FIG. 3d. The last pixel of a line forms the central element of this template. This element therefore has the value '1', while only one of the adjacent pixels has the value '1'. The algorithm sets all values from '1' to '0' with the exception of those pixels which form an end of a line. It is possible to obtain additional information about the direction of the line at the endings, by also applying the algorithm to templates which are rotated through multiples of 60° relative to the template of FIG. 3d. This information about the direction can additionally be used for identifying the image content (e.g. of a fingerprint).

During the extraction of the minutiae of a fingerprint, these algorithms are employed multiply in succession. Preferably, firstly the algorithm for removing individual black pixels and for smoothing the contours of the lines is employed. White gaps are then filled in. The algorithm for thinning the lines (templates as shown in FIG. 3c) and the algorithm for removing individual black pixels are then employed alternately a number of times until the result is a distinctly contoured image having all the essential characteristics of the fingerprint. The number of passes of these algorithms can be fixed in a suitable manner depending on the dimensions of the grid and the desired accuracy. The algorithm for finding the endings of the lines is subsequently employed.

Preferably, storage units are used which are provided with two storage devices, so that the values resulting from the measured values of the sensor elements and the complementary values with respect thereto can be stored. The respective second storage devices of a storage unit therefore contain the inverted image, that is to say the negative of the original black-and-white image. This inverted image can be used to find the branching points of the lines, since the likewise linear interspaces between the lines end at the branching points of the lines, so that the ends of the lines of the inverted image mark the branching points of the lines of the original image.

The logical and arithmetic operations of the algorithms specified can be realized as a circuit in a sufficiently miniaturized form, and can therefore be implemented in a processor element which is assigned directly to the sensor element within the grid of the apparatus. By virtue of the processor elements being connected up to one another in a suitable manner, it is therefore possible in the case of the apparatus according to the invention to have algorithms of this type implemented by processor elements which are integrated into the grid of the arrangement of sensor elements and at the same time have a sufficient functionality for the intended processing of the image.

Figure 4:
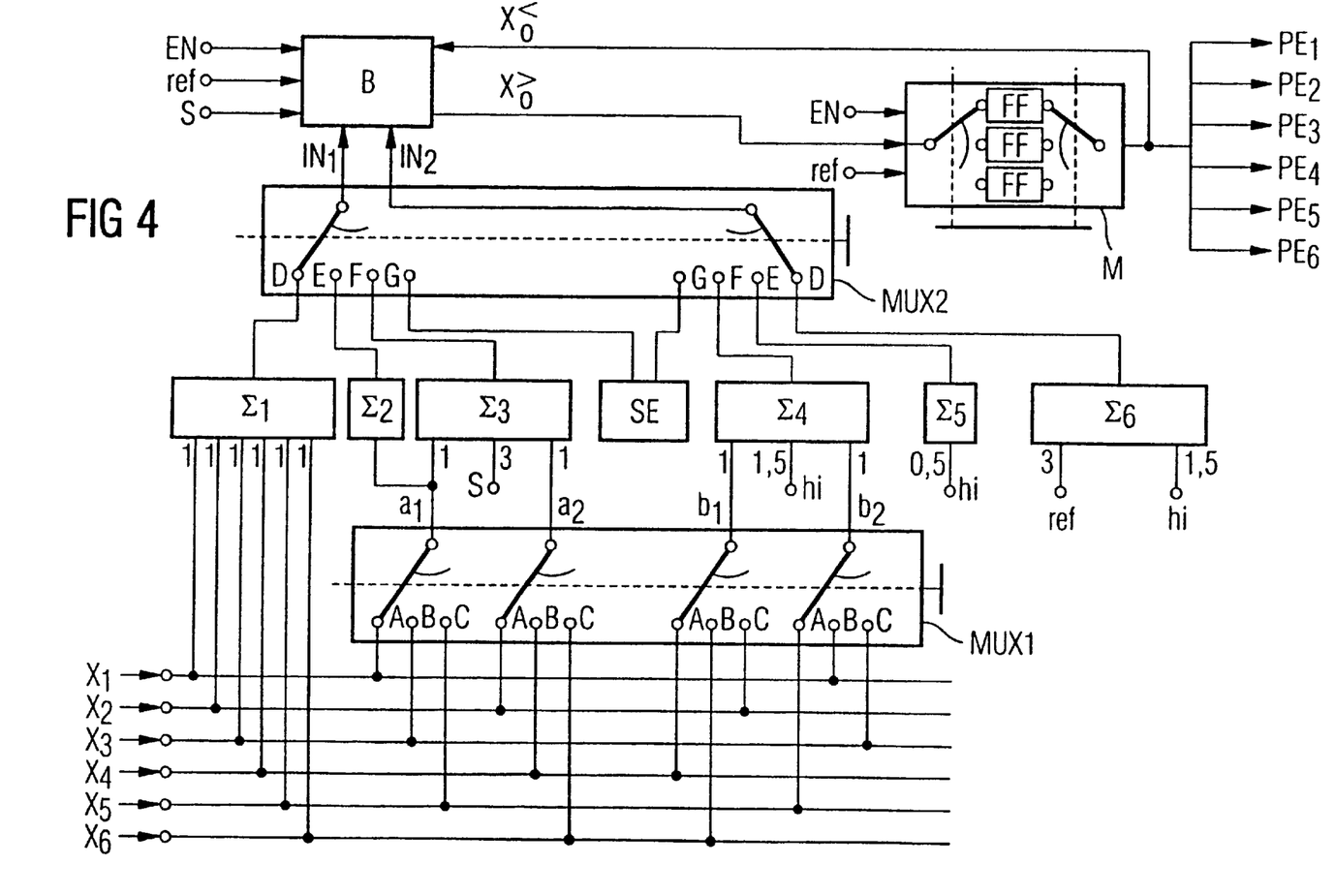
FIG. 4 is a circuit schematic of an embodiment of the circuit of a processor element.

In order to implement the logic circuit of a processor element, it is possible to use neuron MOS circuitry with which the specified algorithms can be implemented, for example in accordance with the circuit diagram of FIG. 4. The circuit contains a circuit block B with an evaluation circuit to which suitably weighted values are fed via a number of neuron MOS transistors which can each be changed over in pairs. The evaluation circuit may, for example, comprise a latch which maintains its state after the evaluation. The inputs EN (enable) and ref (reference) decide whether or not evaluation is carried out. Via the input S the evaluation circuit can be caused to yield the negative output value. In the case of S=1, the circuit yields e.g. the value, '1' if the value at the first input IN1 is greater than the value at the second input IN2; if S=0, the circuit correspondingly yields the value '1' if the value at the first input IN1 is less than the value at the second input IN2.

The circuit additionally comprises a first multiplexer (multiple switch) MUX1, a second multiplexer MUX2 and six summers $\Sigma_1$, $\Sigma_2$, $\Sigma_3$, $\Sigma_4$, $\Sigma_5$ and $\Sigma_6$, which may be realized by neuron MOS transistors. The values $X_1$, $X_2$, $X_3$, $X_4$, $X_5$ and $X_6$ yielded by the connected processor elements are fed from the input, in a manner corresponding to the interconnections illustrated in FIG. 4, to the first summer $\Sigma_1$ and/or the inputs of the first multiplexer $MUX_1$. The inputs A, B and C of the first multiplexer are present a number of times and a changeover between the inputs is made simultaneously in each case, so that in each case the input values at the inputs A or the input values at the inputs B or the input values at the inputs C are connected to the four outputs of the first multiplexer.

The second multiplexer MUX2 is changed over simultaneously, so that the two outputs are each connected to the two inputs D, E, F or G, respectively. As a result of the specially set capacitance ratios, each pair of neuron MOS transistors constitutes a specific type of algorithm (indicated by the numbers entered at the inputs of the summers), that is to say the templates of FIG. 3 are represented in the example. The summers $\Sigma_1$ and $\Sigma_6$, and $\Sigma_2$ and $\Sigma_5$, and $\Sigma_3$ and $\Sigma_4$, are formed together by respective pairs of neuron MOS transistors. If the input F is selected, the values $a_1+a_2+3S$ and $b_1+b_2+1.5$ are present at the inputs IN1 and IN2, respectively, of the circuit block B in accordance with the arithmetic operations of the summers $\Sigma_3$ and $\Sigma_4$, respectively. In accordance with the above-described configuration of the circuit block B, the inequality sign ">" between the abovementioned quantities at the inputs of the circuit block B is crucial for the evaluation in the case of Si, and the inequality sign "<" between the quantities is crucial for the evaluation in the case of S=0.

In the example of FIG. 4, three of the required algorithms can be implemented by the selection of the neuron MOS transistor pair (inputs D, E or F of the second multiplexer MUX2). If S=1, ref=1 and the second multiplexer is switched to input D, the summers $\Sigma_1$ and $\Sigma_6$ yield the sum of the values $X_1$ to $X_6$ and the value 4.5, which are compared with one another by the inequality sign ">". It is therefore ascertained whether at least five of the adjacent processor elements yield the value '1'.

If S=1 or S=0, ref=0 and the second multiplexer MUX2 is switched to the input D, the sum of the values $X_1$ to $X_6$ and the value 1.5 are present at the inputs IN1 and IN2, respectively, of the circuit block B. In the evaluation circuit it is ascertained whether the sum of the values communicated by the adjacent processor elements is greater (S=1) or less (S=0) than 1.5. That is important for the algorithms for eliminating individual black pixels and for smoothing the line edges, or for the algorithm for identifying the endings of the lines. By means of a combination of the summers $\Sigma_2$ and $\Sigma_5$ and the second multiplexer being switched to the input E, a value '1' can be shifted in three different main directions within the arrangement.

If the second multiplexer is switched to the inputs F, the values $a_1+a_2+3S$ and $b_1+b_2+1.5$ are compared with one another. If S=0, a check is made to see whether the first value is less than the second value; if S=1, a check is made to see whether the first value is greater than the second value. That can only be the case whenever $a_1$ and $a_2$ are not both equal to '0' and b, and $b_2$ are not both equal to '1', or vice versa. If $a_1=a_2$='0' or '1' and $b_1=b_2$='1' or '0', the circuit block B therefore yields the value '0', which is desired for the algorithm for thinning the lines. In accordance with the wiring of the inputs, the values $a_1$ and $a_2$, and $b_1$ and $b_2$, are respectively assigned to two pairs of connected processor elements whose components are each adjacent to one another, but are not adjacent to the components of the other pair.

If a latch is used for evaluating the weighted potentials generated by the neuron MOS transistor pairs, then the state storage device may be realized by an arbitrary single-stage flip-flop, since the present state is in each case stored in the evaluation circuit (that is to say the evaluation circuit is the master flip-flop, and the flip-flop of the state storage device is the slave flip-flop). The state storage device M also has an EN input (enable) which decides whether or not a new state is accepted. It is possible for there to be a plurality of such state storage devices present, between which a changeover may be made, as is indicated in the storage device illustrated in FIG. 4. As a result, it is possible additionally to store intermediate states during processing. In order to read in the value '0' or '1' assigned to the measured value of the relevant sensor unit SE, the second multiplexer MUX2 is switched to the inputs G. New values of the relevant pixel $X_0^>$ are forwarded to the storage unit M from the circuit block B. Since the old value $X_0^<$ in the pixel is crucial as a boundary condition for the evaluation this old value is fed from the storage device M to the circuit block B (which corresponds to the feedback of $X_0^<$ illustrated in FIG. 4). The old values $X_0^<$ are also forwarded to the connected processor elements $PE_1$, $PE_2$, $PE_3$, $PE_4$, $PE_5$ and $PE_6$. The logic circuit in the circuit block B is preferably configured in such a way that a new value is evaluated or accepted into the state storage device only when the value stored by the evaluating processor element itself meets suitable conditions. For the algorithms for smoothing the edges, for thinning the lines and for finding the endings, said condition is that the stored value $X_0^<$=1; for the algorithm for filling in white gaps, it must be the case that the previous state $X_0^<$=0. The circuit block B may contain circuits which have the effect that if the relevant condition is not met, evaluation is not even carried out in the first place, and the stored value just remains unchanged. Therefore, during the performance of the algorithms, only the relevant processor elements are ever activated, as is necessary for correct performance of the algorithms. Moreover, the processing speed can thus be increased and energy saved.

Figure 5:
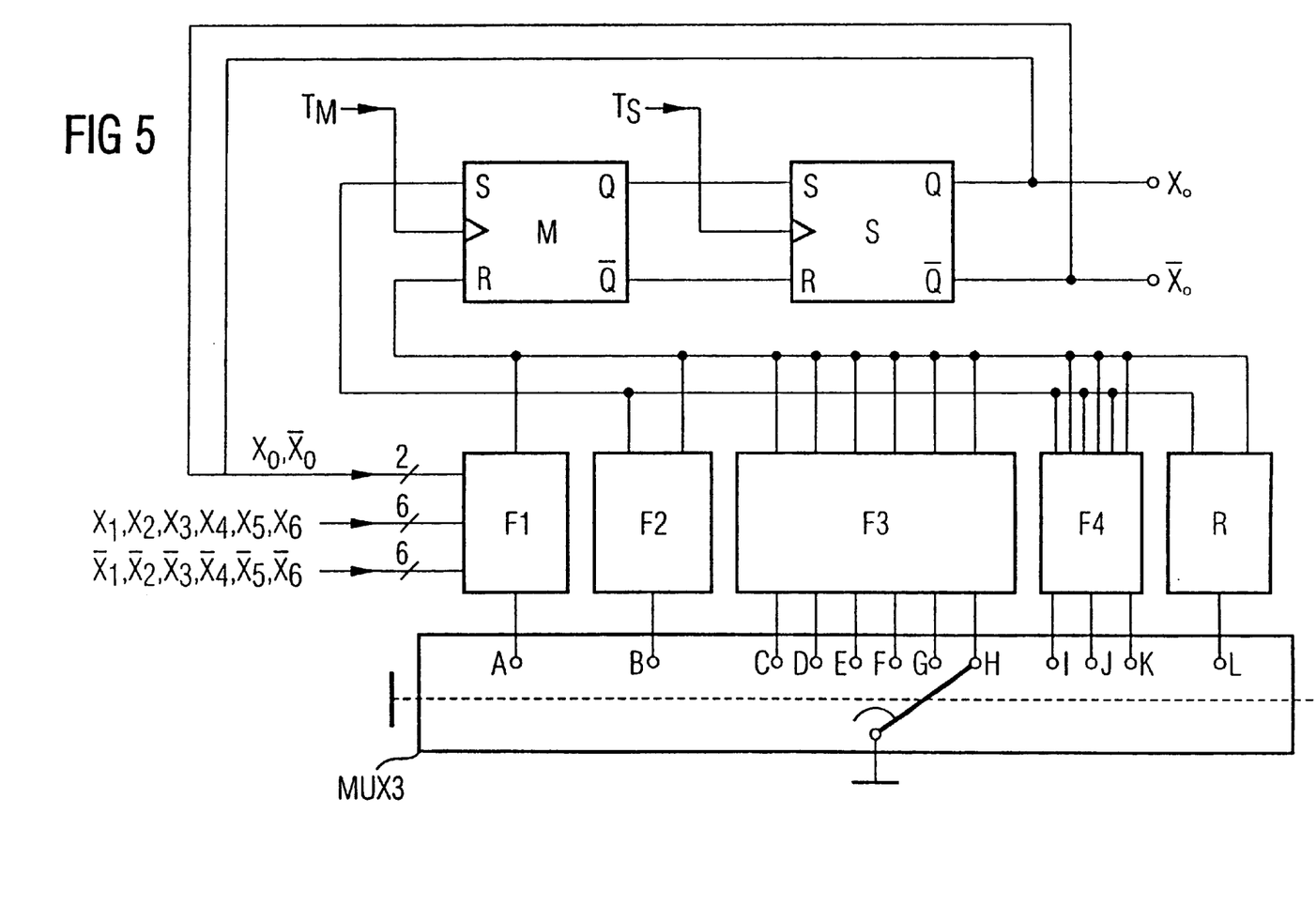
FIG. 5 is a circuit schematic of an alternative exemplary embodiment of the circuit of a processor element.

The circuit variant illustrated in FIG. 5 has a plurality of functional blocks F1, F2, F3, F4 and R. Also present are a 1-out-of-12 decoder as multiplexer MUX3 and a special master-slave RS flip-flop for storing the state and for carrying out the evaluation. The functional blocks each comprise a number of NMOS transistors which are suitably connected in series and respectively in parallel as AND gates and OR gates and are each operated with a logic level '0' or '1' at the gate. A functional block has two terminals between which it either is or is not current-conductive, depending on its state. A plurality of these functional blocks are connected in parallel; however, only one functional block is ever connected to ground by the multiplexer MUX3. The six inputs for the values $X_1$, $X_2$, $X_3$, $X_4$, $X_5$ and $X_6$ communicated by the connected processor elements and for their complementary values are combined in a respective line in order to simplify the illustration.

Figure 6:
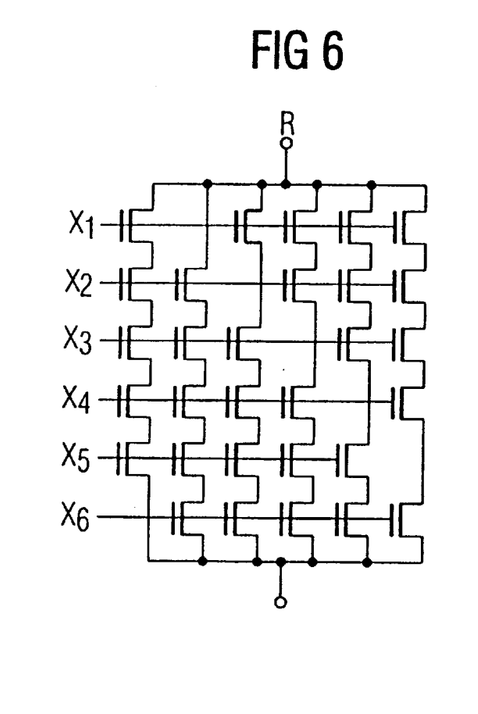
FIGS. 6–10 are various circuit diagrams of the circuit blocks in FIG. 5.
Figure 7:
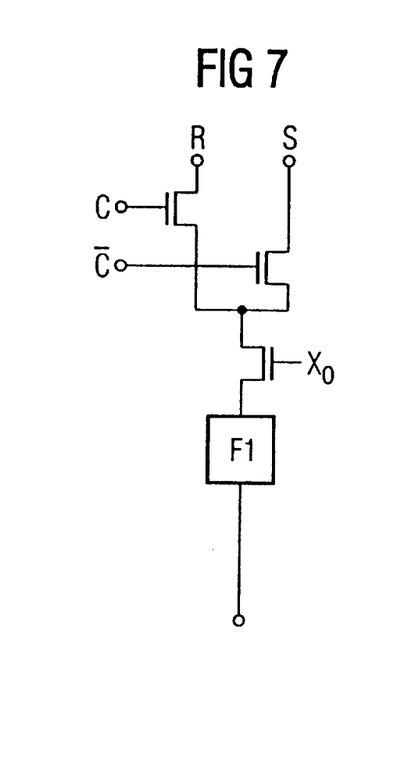
Figure 8:
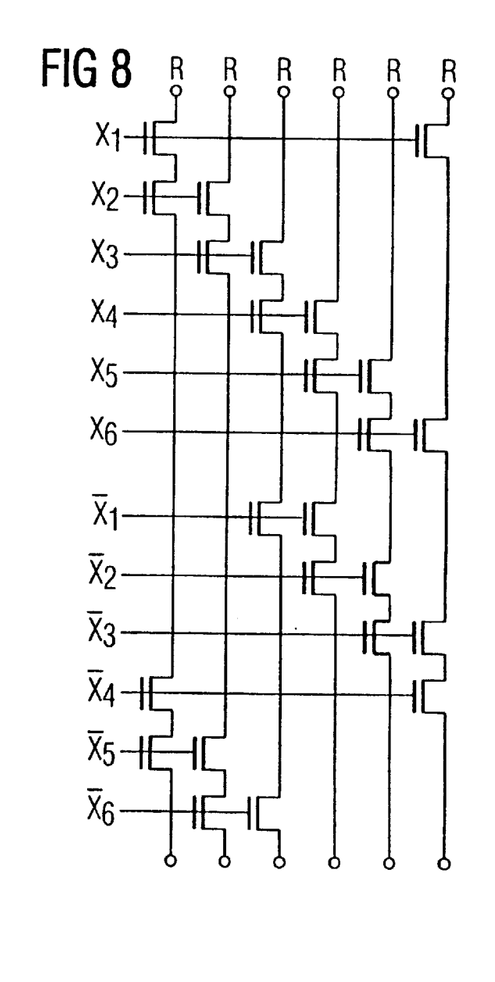
Figure 9:
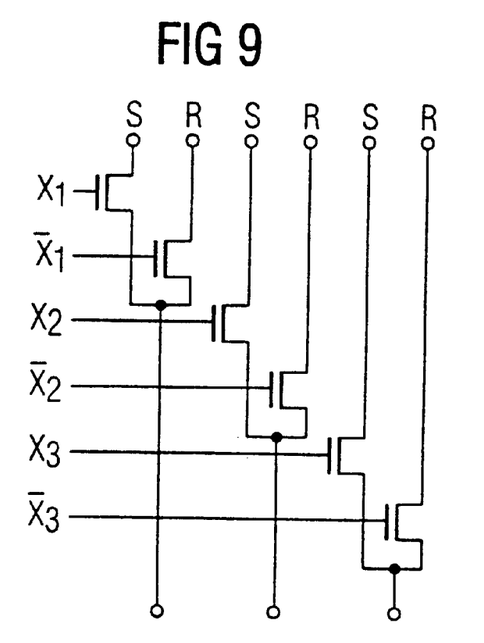
Figure 10:
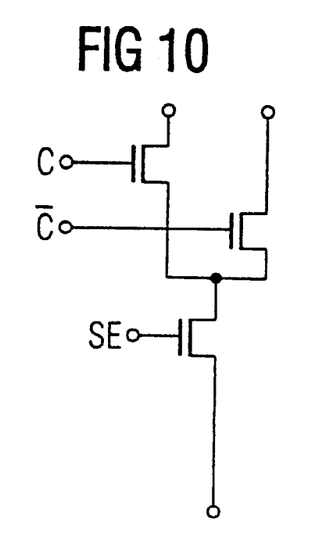

FIG. 6 shows a possible configuration of the functional block F1, FIG. 7 of the functional block F2, FIG. 8 of the functional block F3, FIG. 9 of the functional block F4 and FIG. 10 of the functional block R. The functional block F1 short-circuits to ground if at least five of the six values $X_1$ to $X_6$ have the logic value '1' (for implementing the algorithm by means of which the gaps are filled in). The functional block F2 can be used to implement the algorithms for smoothing the edges and for identifying the endings of the lines. The global control quantity C (FIG. 7) is used to effect changeover between these algorithms. The functional block F3 serves for implementing the algorithm for thinning the lines. The functional block F4 can be used to shift the values in the pixels of the line endings in the three main directions of the grid. The functional block R (FIG. 10) is used to read in the logic value supplied by the sensor element (input SE).

Owing to the NMOS pass transistor logic used, only '0' (ground potential) or '1' (connection open, since switch turned off) is ever present at the inputs R and S of the master-slave RS flip-flop in the case of the circuitry illustrated in the FIGS. If complementary pass transistor logic is used, it is also possible to obtain the respectively inverted logic level, but this entails a doubling of the area required.

Figure 11:
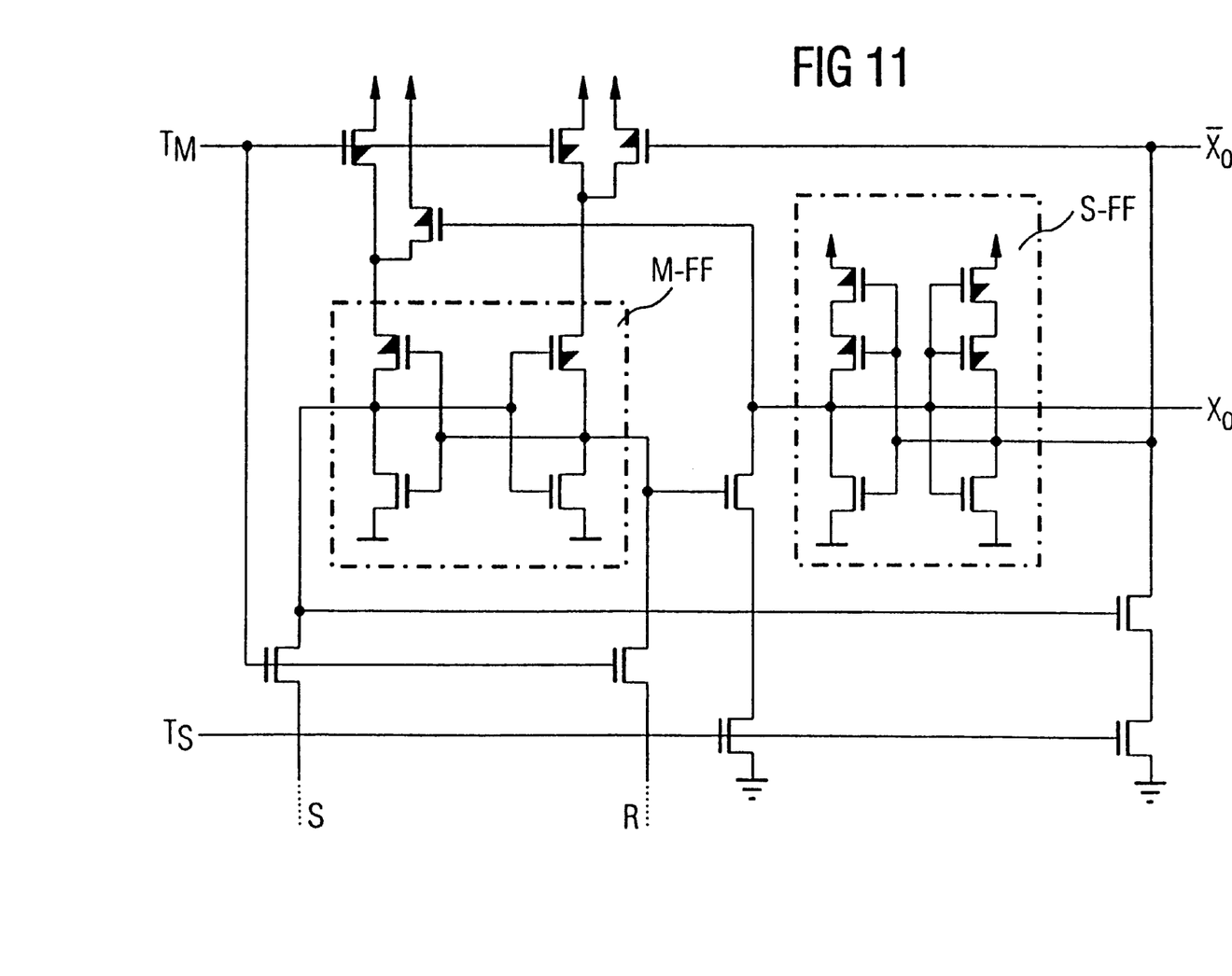
FIG. 11 is a schematic of an MS-RS-FF which is suitable as a storage unit of the apparatus in accordance with FIGS. 5 to 10.

An exemplary embodiment of a suitable state storage device for the embodiment of the circuit as shown in FIG. 5 is illustrated in FIG. 11. The method of operation of this special flip-flop is preferably suitable for implementing the algorithms described in conjunction with the functional blocks specified. The flip-flops that are present are controlled by the clock signals $T_M$ and $T_S$, respectively, which are staggered over time with respect to one another. By multiplying the slave flip-flops, it is possible to store a plurality of states, if selection is effected via supplementary multiplexers.

We claim:

1. An image acquisition apparatus, comprising:

a plurality of sensor elements arranged in a hexagonal grid dimensioned for acquiring a fingerprint sufficiently differentiated for identifying a person;

a plurality of processor elements each associated with a respective sensor element and integrated in accordance with said grid;

each of said processor elements having a memory unit for storing values;

each of said processor elements being connected to adjacent processor element in said grid for receiving values output by said adjacent processor elements;

said sensor elements being constructed for a capacitive measurement within a patterned, electrically conductive layer;

circuits associated with said sensor elements or said respectively assigned processor elements for generating a logic '0' or '1' depending on a capacitance ascertained by said sensor element;

said processor elements being adapted to store a logic "0" or "1"; and each of said processor elements being configured for implementing algorithms for:

a) setting the stored value from '1' to '0' if at most one connected processor element communicates a value '1';

b) setting the stored value from '0' to '1' if at least five connected processor elements communicate the value '1';

c) setting the stored value from '1' to '0' if at least two connected processor elements communicate the value '1';

d) setting the stored value from '1' to '0' if two connected processor elements of a first pair communicate the value '1' and two connected processor elements of a second pair communicate the value '0' and if the connected processor elements belonging to the same pair are adjacent to one another in the grid and are not adjacent to the processor elements of the respective other pair.

2. The apparatus according to claim 1, which said storage units have at least one first storage device and one second storage device, and said processor elements are configured for storing, with respect to a measured value communicated by said sensor element, one of two possible values in said first storage device and the respective other possible value in said second storage device.

3. The apparatus according to claim 1, wherein each processor element is constructed with at least one neuron MOS circuit for weighting the values communicated by connected processor elements, arithmetically combining the values with one another, and feed the values to an evaluation circuit.

4. The apparatus according to claim 3, wherein said neuron MOS circuit comprises:

a first multiplexer with twelve inputs, enabled for a simultaneous changeover for selecting four of said inputs simultaneously in each case, and with four outputs;

a second multiplexer with eight inputs, enabled for a simultaneous changeover for selecting two of said input simultaneously in each case, and with two outputs;

said evaluation circuit with a first input and a second input connected to said outputs of said second multiplexer, and a further input via which said evaluation circuit can be caused to yield the logic value '1' if a value at said first input is greater than a value at said second input, and to instead yield the logic value '1' if the value at said first input is less than the value at said second input; and six summers each two formed by respective pairs of neuron MOS transistors;

wherein the values supplied by said connected processor elements are fed to a first one of said summers and to said inputs of said first multiplexer, so that the values of two pairs of processor elements which are adjacent to one another, but are not adjacent to the respective other pair, are always present at said outputs of said first multiplexer; and some of said summers being connected to said outputs of said first multiplexer and a respective pair of said summers or said sensor element being connected to simultaneously selected inputs of said second multiplexer such that the algorithms can be processed by changing over said multiplexers.

5. The apparatus according to claim 1, wherein each said processor element is constructed with at least one NMOS pass transistor logic circuit operating as a switch between a reference-ground potential and an evaluation circuit.

6. The apparatus according to claim 5, wherein said circuit includes:

first, second, third, fourth, and fifth functional blocks each comprising a number of NMOS transistors connected as one of AND gates and OR gates;

a multiplexer with one input and twelve outputs; and a master-slave RS flip-flop for storing a state and for carrying out an evaluation; and wherein said functional blocks are connected in parallel between said multiplexer and said master-slave RS flip-flop and only one functional block is at one time connected to the reference-ground potential via said multiplexer;

inputs for receiving the values communicated by the respectively connected said processor elements and complementary values thereof at said functional blocks;

wherein said first functional block short-circuits an input of said master flip-flop to the reference-ground potential if at least five of the six communicated values have the logic value '1';

wherein said second functional block short-circuits an input of said master flip-flop to the reference-ground potential if at least five of the six communicated values have the logic value '1' and a signal at the output of the slave flip-flop has an intended logic value, the relevant input being selected by transistors using a global control quantity and a complement thereof;

wherein said third functional block short-circuits an input of said master flip-flop to the reference-ground potential if the communicated values of two connected processor elements of a first pair, said processor elements being selected by said multiplexer and being adjacent to one another, have the logic value '1' and the communicated values of two connected processor elements of a second pair, said processor elements being adjacent to one another and not being adjacent to the processor elements of the first pair, have the logic value '0';

wherein said fourth functional block short-circuits an input of said master flip-flop to the reference-ground potential depending on whether the communicated value of a connected processing element, selected by said multiplexer, has the logic value '0' or '1' in one of three directions provided; and wherein said fifth functional block has a transistor controlled by the logic value supplied by said sensor element and by means of which an input of the master flip-flop is short-circuited to the reference-ground potential depending on the global control quantity and the complement thereof.

7. The apparatus according to claim 1, wherein said grid has an edge and said outputs of said processor elements at the edge of the grid are fed back to a free input thereof, for establishing virtually mirror-symmetrical boundary conditions at the edges.

* * * * *